(12) United States Patent
Al-Sadah

(10) Patent No.: US 8,287,716 B2
(45) Date of Patent: Oct. 16, 2012

(54) DESALINATION SYSTEM AND METHOD

(75) Inventor: Jihad Hassan Al-Sadah, Safwa (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 833 days.

(21) Appl. No.: 12/385,163

(22) Filed: Mar. 31, 2009

(65) Prior Publication Data

US 2010/0243473 A1    Sep. 30, 2010

(51) Int. Cl.
  *C02F 1/461*    (2006.01)
(52) U.S. Cl. ........ 205/628; 205/633; 205/637; 204/266; 204/278
(58) Field of Classification Search .......... 205/628–639; 204/266, 278
See application file for complete search history.

(56) References Cited

U.S. PATENT DOCUMENTS

| | | | |
|---|---|---|---|
| 2,976,224 A | | 3/1961 | Gilliland |
| 3,262,869 A | * | 7/1966 | Belasco et al. ............... 205/343 |
| 3,724,229 A | | 4/1973 | Seliber |
| 3,948,734 A | | 4/1976 | Kohl et al. |
| 4,236,382 A | | 12/1980 | Cheng et al. |
| 4,420,318 A | | 12/1983 | Cheng et al. |
| 4,467,621 A | | 8/1984 | O'Brien |
| 4,810,274 A | | 3/1989 | Cheng et al. |
| 5,279,260 A | * | 1/1994 | Munday ........................... 122/5 |
| 5,282,979 A | | 2/1994 | Wilson |
| 5,552,022 A | | 9/1996 | Wilson |
| 5,853,549 A | | 12/1998 | Sephton |
| 6,309,513 B1 | | 10/2001 | Sephton |
| 6,833,056 B1 | | 12/2004 | Kamiya et al. |
| 7,228,713 B2 | | 6/2007 | Chou |

FOREIGN PATENT DOCUMENTS

| | | |
|---|---|---|
| EP | 1840089 | 10/2007 |
| GB | 1185824 | 3/1970 |
| GB | 1307717 | 2/1973 |

* cited by examiner

*Primary Examiner* — Arun S Phasge
(74) *Attorney, Agent, or Firm* — Richard C. Litman

(57) ABSTRACT

The desalination system and method places water from the sea under electrolysis to produce hydrogen and oxygen gas. The system has a chamber that is filled with the hydrogen gas displacing other gases. Once the chamber is filled with only hydrogen gas, the oxygen is introduced to form water vapor within the chamber. Liquid water collects on the lower surface of the chamber, and water vapor condenses on the sidewalls. The condensation creates a partial vacuum in the chamber, causing further water to evaporate from the liquid water on the lower end of the chamber. The condensate is desalinated water, which may be collected. Condensation may be assisted through cooling the wall. The hydrogen and oxygen mix in the chamber undergoes a reaction through electrical spark generation from a spark plug to create the water vapor.

2 Claims, 2 Drawing Sheets

DESALINATION SYSTEM AND METHOD

BACKGROUND OF THE INVENTION

1. Field of the Invention

The present invention relates to a water purification systems, and particularly to a desalination method and system for removing salt(s) from water.

2. Description of the Related Art

Water desalination is a process by which salt is separated from salt water. Evaporation is an effective method of achieving this goal. Evaporation is a process involving a phase change in water molecules from a liquid to a gaseous state while leaving the water surface and the dissolved materials in the liquid state. The rate of evaporation is enhanced by increasing the liquid temperature and/or decreasing the pressure on the liquid, i.e., performing evaporation in a vacuum.

While many methods are known, there is a need for a desalination process that is easy to perform and economical. Thus, a desalination system and method solving the aforementioned problems is desired.

SUMMARY OF THE INVENTION

The desalination system and method is a process performed under vacuum that utilizes a vessel having a cone-like pointed bottom surface and a plurality of valves, including a valve disposed at the bottom of the vessel. Hydrogen is introduced slowly into the vessel, displacing the heavier gasses, such as nitrogen and oxygen, in a downward direction. Eventually the hydrogen fills the vessel. The vessel is subsequently closed from below. Oxygen gas is then introduced in a quantity that is enough to reconstitute water vapor from the existing hydrogen gas. The gas mixture is then reacted either violently, by a spark plug, or in a slower way, through membrane reactions, for example. Any transient high pressure resulting from the reaction is contained by the strong structure of the vessel. Additionally, the internal high pressure could be released through a valve or utilized to pump water from a bottom tank to an upper tank, for example. A water electrolysis process produces the hydrogen and oxygen utilized by the system. At the end of the process, the vessel contains mostly water vapor.

The water vapor produced by the hydrogen-oxygen reaction eventually condenses on the container's inner walls, creating partial vacuum that is useful for several purposes. The vacuum is preferably applied on the water surface to increase the rate of water evaporation, precipitating salt out of the water, thereby achieving water desalination. Alternatively, the process may be used to produce chilled water for air conditioning purposes.

The water vapor can be collected by conventional cooled surface condensation. The surface condensation cooling method utilizes the cooled water discharged from the evaporative process. Moreover, a high electrostatic field may be applied within the vessel as an alternative water vapor collection method.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
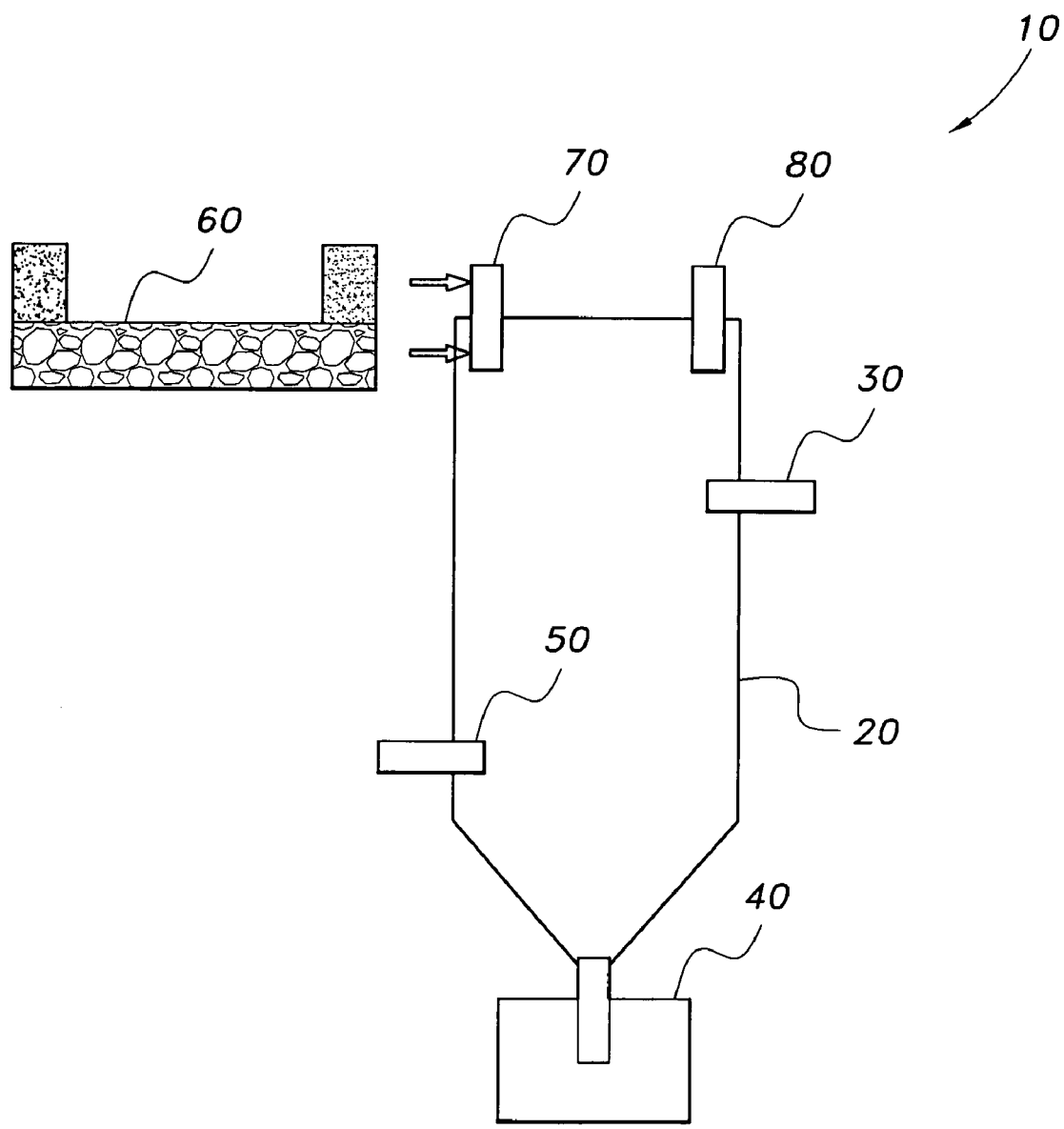
FIG. 1 is a block diagram of a desalination system according to the present invention.

As shown in FIG. 1, in one embodiment the desalination system 10 includes a vessel 20 and a plurality of valves, the vessel 20 having a cone-like pointed bottom surface having a valve, sensor and water condensate collector disposed thereon. The vessel 20 may have a plurality of plates that increase the surface area of the water to enhance the evaporation process. The system 10 may also include a water electrolysis unit 60. The water electrolysis unit 60 takes water $H_2O$ and, via separate, oppositely charged electrodes, produces hydrogen ($H_2$) gas at a first electrode and oxygen ($O_2$) gas at a second electrode. Moreover, the electrolysis unit 60 may store small amounts of hydrogen and oxygen generated, and may accept a distilled water recharge from the output of tank 20. Via a hydrogen leg of dual entrance valve 70, the hydrogen gas is introduced slowly into vessel 20, displacing heavier gases, such as nitrogen ($N_2$) and oxygen ($O_2$), in a downward direction inside chamber 20. The effect of displacing heavier gases is to create a partial vacuum in tank 20. Eventually the $H_2$ fills the vessel 20. The vessel 20 is subsequently closed from below at an air outlet hydrogen sensor and water condensate valve/collector 40. Alternatively, the tank could be filled with water first. The hydrogen gas may then displace the water in the same manner as described above.

Oxygen gas ($O_2$) is then introduced via an $O_2$ leg of dual entrance valve 70 in a stoichiometric amount that is enough to reconstitute water vapor from the existing hydrogen gas. Spark plug 30 literally sparks the reaction ($2H_2 + O_2 \rightarrow 2H_2O$ (vapor)) to produce the desalinated water vapor. Alternatively, membrane reactions or some other known method could be utilized to produce the desalinated water from the hydrogen and oxygen gas in the tank 20. Tank 20 is preferably designed to maintain structural integrity while withstanding high pressure spikes resulting from the reaction. Additionally, the resultant internal high pressure can be released through pressure relief valve 50 or utilized to pump water from a lower tank to an upper tank. At the end of the process, the vessel 20 contains mostly water vapor. A water vapor valve 80 is disposed near the top of vessel 20.

Water vapor produced by the hydrogen-oxygen reaction eventually condenses on the container's inner walls, creating a partial vacuum that is useful for several purposes. The vacuum is preferably applied on the water surface to increase the rate of water evaporation, precipitating salt out of the water, thereby achieving water desalination. Alternatively, the process may be used to produce chilled water for air conditioning purposes.

The water vapor can be collected via conventional cooled surface condensation. The surface condensation cooling method utilizes cooled water discharged from the evaporative process. Moreover, a high electrostatic field may be applied within the vessel as an alternative water vapor collection method.

The system 10 is scalable and may be deployed as a desalination unit for individual homes, where the input water could be seawater in a coastal region, or well water, or sub-optimal mains water. The heating in this case could be environmental heat or a solar roof water heater, for example. The heat can be recirculated. The strong vacuum maintained in vessel 20 offsets the need for high input temperatures. An exemplary target production capability is approximately several hundred liters per day. In a scaled-up version for entire communities, several vessels could be used to maintain vacuum level at a target water tank. Water also could be broken down into droplets as applied in spray drying methods.

Figure 2:
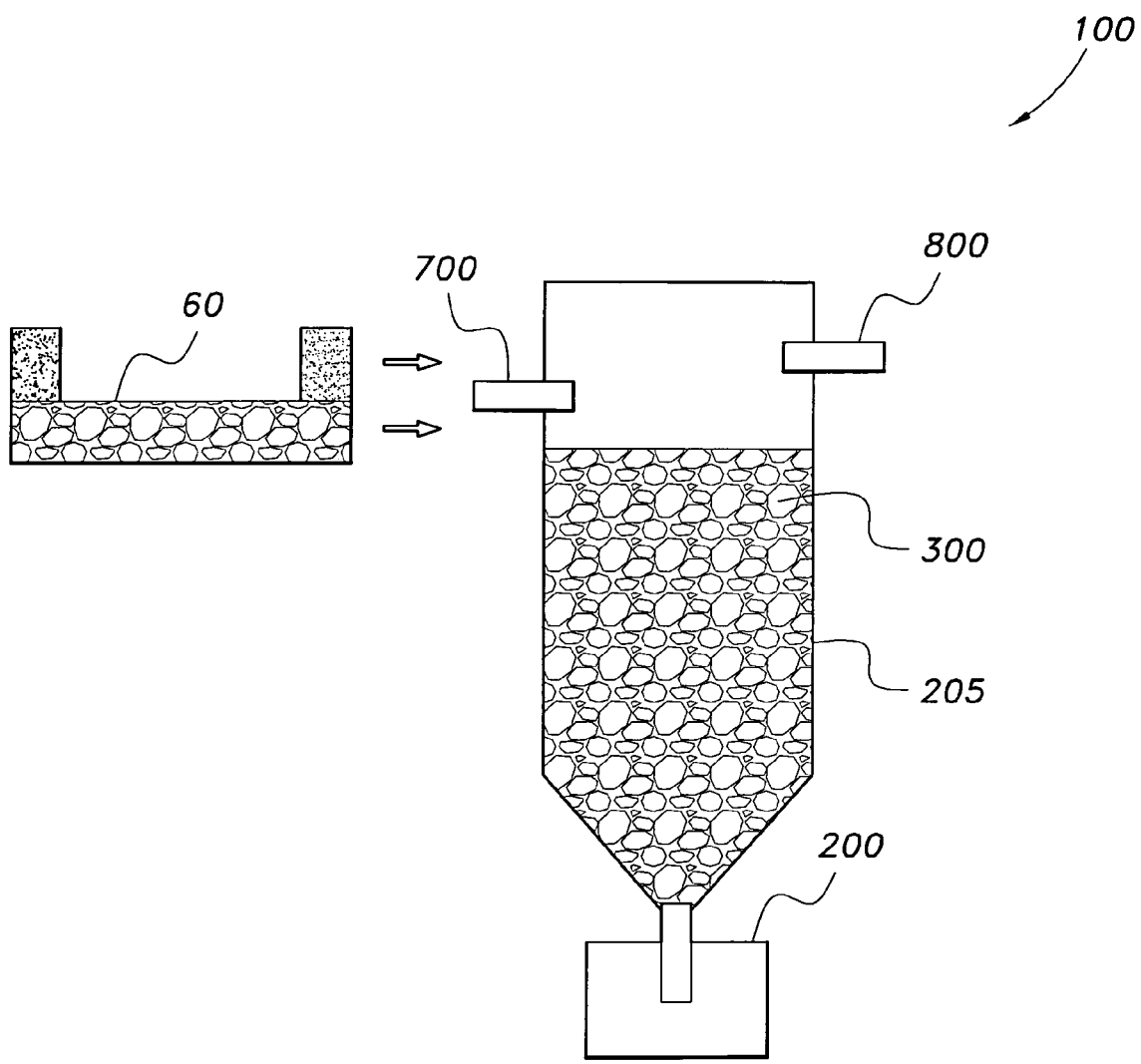
FIG. 2 is a block diagram of an alternative embodiment of a desalination system according to the present invention.

As shown in FIG. 2, in an alternative embodiment, designated as flushing system 100, a hydrogen-oxygen reaction may be utilized to improve the water flushing efficiency. Transient high pressure resulting from the reaction is released in a toilet flushing tank 205, thereby improving its efficiency, the water being forced by the transient high pressure through a water flushing outlet 200. The resultant high pressure of the alternative system 100 allows a lower quantity of water to be used in the toilet tank 205. The water to be flushed is contained in airtight flushing tank 205 that has an air pocket (space above the level of the water 300) disposed in a top portion thereof. The gas, viz., hydrogen (or, alternatively, natural gas or the like), is selectively introduced into flushing tank 205 by valve 700. A portion of the gas in the flushing tank 205 is commingled with the air pocket at the top portion of the flushing tank 205 just after water flushing is requested.

A spark plug 800 is proximate the gas-air mixture in the air pocket and generates an electric spark, which starts the reaction creating a pressure wave that increases the kinetic energy of the flushing water 300, thus reducing the quantity of water needed to flush the toilet. The process is analogous to the combustion pressure developed in a cylinder of an internal combustion engine (ICE), transferring energy to drive a piston downward in the cylinder, the flushing toilet water being functionally equivalent to the piston of the ICE. The gas can be generated by water electrolysis unit 60 or, alternatively, the utilized gas can come from a natural gas tank within the toilet system, or a connection to a gas utility supply grid. The timing of selective introduction of gas subsequent to a flush request, and then the spark plug ignition, can be accomplished by any desired method, including, but not limited to, having the valves and the spark source controlled by programming instructions running on a microprocessor, programmable logic controller, or the like.

It is to be understood that the present invention is not limited to the embodiment described above, but encompasses any and all embodiments within the scope of the following claims.

I claim:
1. A desalination system, comprising:
an electrolysis unit adapted for performing electrolysis on salt water to produce hydrogen and oxygen gas;
a desalination tank, an air outlet being formed through a lower end of said desalination tank;
a hydrogen sensor being disposed on the lower end of said desalination tank adjacent the air outlet;
a water condensate valve and collector being disposed on the lower end of said desalination tank;
means for delivering the hydrogen gas through a hydrogen gas entrance valve in operable communication with the desalination tank, the hydrogen gas entrance valve being in fluid communication with the electrolysis unit for receiving the hydrogen gas from the electrolysis unit and infusing the hydrogen gas into the desalination tank, wherein the hydrogen gas fills the desalination tank to drive heavier ambient fluid therefrom, through the air outlet, and create a partial vacuum therein;
means for closing the air outlet when said hydrogen gas has driven the heavier ambient fluid from the desalination tank;
means for delivering the oxygen gas through an oxygen gas entrance valve in operable communication with the desalination tank after the heavier ambient fluid has been driven from the desalination tank and the air outlet has been closed, the oxygen gas entrance valve being in fluid communication with the electrolysis unit for receiving the oxygen gas from the electrolysis unit and infusing the oxygen gas into the desalination tank;
a spark plug disposed on the desalination tank, the spark plug being adapted for discharging an electrical spark into the desalination tank in order to cause a reaction between the hydrogen and oxygen in the tank, the reaction creating water vapor in the tank;
a pressure relief valve disposed on the desalination tank, the pressure relief valve relieving excess internal pressure caused by the reaction; and
a water vapor valve disposed on the desalination tank for allowing flow of water vapor from an upper end of the desalination tank, wherein condensate formed on internal walls of the desalination tank is removed through the water condensate valve and collector.

2. A desalination method, comprising the steps of:
providing a desalination system, the desalination system including:
a) an electrolysis unit adapted for performing electrolysis on salt water to produce hydrogen and oxygen gas;
b) a desalination tank, an air outlet being formed through a lower end of said desalination tank;
c) a hydrogen sensor being disposed on the lower end of said desalination tank adjacent the air outlet;
d) a water condensate valve and collector being disposed on the lower end of said desalination tank;
e) means for delivering the hydrogen gas through a hydrogen gas entrance valve in operable communication with the desalination tank, the hydrogen gas entrance valve being in fluid communication with the electrolysis unit for receiving the hydrogen gas from the electrolysis unit and infusing the hydrogen gas into the desalination tank, wherein the hydrogen gas fills the desalination tank to drive heavier ambient fluid therefrom, through the air outlet, and create a partial vacuum therein;
f) means for closing the air outlet when said hydrogen gas has driven the heavier ambient fluid from the desalination tank;
g) means for delivering the oxygen gas through an oxygen gas entrance valve in operable communication with the desalination tank after the heavier ambient fluid has been driven from the desalination tank and the air outlet has been closed, the oxygen gas entrance valve being in fluid communication with the electrolysis unit for receiving the oxygen gas from the electrolysis unit and infusing the oxygen gas into the desalination tank;
h) a spark plug disposed on the desalination tank, the spark plug being adapted for discharging an electrical spark into the desalination tank in order to cause a reaction between the hydrogen and oxygen in the tank, the reaction creating water vapor in the tank;
i) a pressure relief valve disposed on the desalination tank, the pressure relief valve relieving excess internal pressure caused by the reaction; and
j) a water vapor valve disposed on the desalination tank for allowing flow of water vapor from an upper end of the desalination tank, wherein condensate formed on internal walls of the desalination tank is removed through the water condensate valve and collector;
performing electrolysis on salt water to produce hydrogen and oxygen gas;
infusing the hydrogen gas into a desalination tank;
infusing the oxygen gas into the desalination tank;
discharging an electrical spark into the desalination tank, thereby causing a reaction in the hydrogen and oxygen in the tank, the reaction creating water vapor in the tank;
relieving excess internal pressure caused by the reaction; and
discharging water vapor from the tank.

* * * * *